United States Patent [19]

Takagi et al.

[11] 4,450,491

[45] May 22, 1984

[54] OPERATION LEVER MECHANISM FOR MAGNETIC TAPE RECORDING/REPRODUCING APPARATUS

[75] Inventors: Satoshi Takagi; Toshio Watanabe; Masao Ito, all of Toda, Japan

[73] Assignee: Clarion Co., Ltd., Tokyo, Japan

[21] Appl. No.: 257,648

[22] Filed: Apr. 27, 1981

Related U.S. Application Data

[63] Continuation of Ser. No. 24,705, Mar. 28, 1979, abandoned.

[30] Foreign Application Priority Data

Mar. 31, 1978 [JP] Japan .................................. 53-36704
Mar. 31, 1978 [JP] Japan .................................. 53-36703

[51] Int. Cl.³ ............................................ G11B 15/00
[52] U.S. Cl. .................................. 360/96.5; 360/137
[58] Field of Search ..................... 360/137, 105, 96.5, 360/96.6; 74/483 PB; 200/5 B; 400/478, 667

[56] References Cited

U.S. PATENT DOCUMENTS

| | | | |
|---|---|---|---|
| 3,921,215 | 11/1975 | Asami | 360/93 |
| 3,940,800 | 2/1976 | Tabuchi | 360/60 |
| 3,947,894 | 3/1976 | Chimura | 360/137 |
| 4,003,087 | 1/1977 | Iwasaki | 360/137 |
| 4,071,865 | 1/1978 | Nakasuna | 360/137 |
| 4,106,064 | 8/1978 | Hoshido | 360/105 |
| 4,135,220 | 1/1979 | Ichikawa | 360/137 |
| 4,136,366 | 1/1979 | Ogiro | 360/96.4 |
| 4,138,701 | 2/1979 | Suzuki | 360/137 |

*Primary Examiner*—Alan Faber

*Attorney, Agent, or Firm*—Wallenstein, Wagner, Hattis, Strampel & Aubel

[57] ABSTRACT

An operation lever mechanism for a tape player which comprises an array of operation levers including a play-operation lever for advancing a head plate alone, a stop-operation lever for retiring the head plate, a fast forward-operation lever and a rewind-operation lever, engaging portions provided on the operation levers, respectively; an operating member provided between the operation levers and adapted to be operated, upon depression of any one of the operation levers, through engagement thereof with the depressed operation lever to lock said lever in the depressed position and restore the operation lever adjacent said depressed lever which has been depressed previously; an interlocking member provided in association with the stop-operation lever for an ejecting operation and formed with a projected portion engageable with a salient portion of said stop-operation lever, said operating member having an operation portion for displacing the projected portion of the interlocking member out of the actuation area of the salient portion of the stop-operation lever. With the arrangement, upon depression of any one of the operation levers, the lever previously depressed is released and the lever now depressed is locked in the position and the stop-operation lever can act two ways, namely to stop the operation rendered by the other operation lever and to effect a cassette ejecting operation in cooperation with the interlocking member engaged therewith when any other operation lever is not in an operative condition.

3 Claims, 12 Drawing Figures

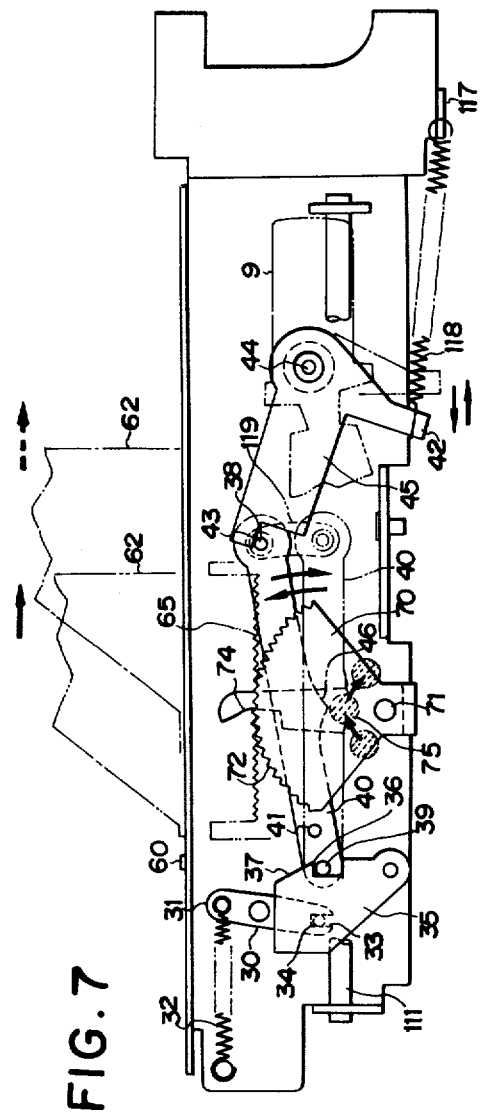
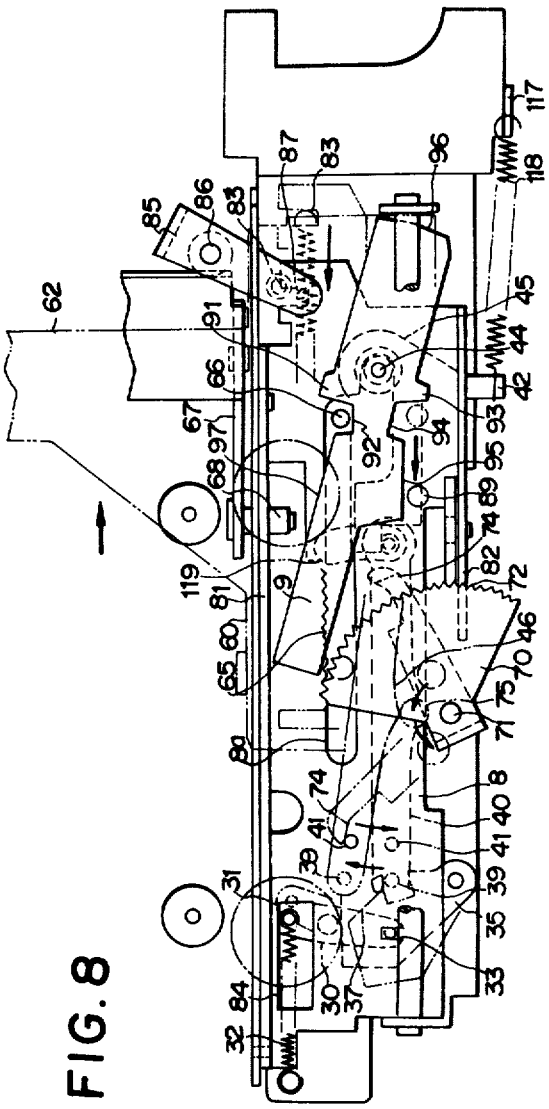
FIG. 7
FIG. 8

OPERATION LEVER MECHANISM FOR MAGNETIC TAPE RECORDING/REPRODUCING APPARATUS

This is a continuation of application Ser. No. 24,705, filed Mar. 28, 1979, now abandoned.

TECHNICAL FIELD

This invention relates to an operation lever mechanism for a magnetic tape recording/reproducing apparatus, and more particularly to an operation lever mechanism of the type which is capable of being operated accurately by a relatively weak force.

BACKGROUND ART

In a magnetic tape recording/reproducing apparatus, especially of a type wherein a two-reel tape pack is used, it is required to feed the tape pack loaded in the apparatus into a recording/reproducing position and to advance or retire a head plate on which a head and pinch rollers are mounted, and it is also required to temporarily stop a play-operation mode or to replace the tape pack loaded in the apparatus by a new one and to effect a fast forward-operation and a rewind-operation. Known mechanisms for carrying out these operations are generally based on either one of two approaches. One approach is based on an attempt to carry out the operations with a reduced number of operation levers, while the other idea is to provide operation levers for the respective operations and to make the operation levers carry out the operations, respectively. These known mechanisms of either type, however, have defects and disadvantages. More particularly, though the former mechanism has such an advantage that the operation portion of a recording/reproducing apparatus is simplified, it has a shortcoming of relatively poor operability because the number of the mechanism components to be actuated by each of the operation levers are increased and the work stroke is also increased. On the other hand, the latter mechanism can solve this problem but it is not possible to make uniform the forces and work strokes required for the respective operations. Through a play-stop mode can be established by retiring a head plate alone in an ejecting operation, when it is required to change tape transport modes from one mode to another, the operation in said mode must be once stopped to allow the operation in said another mode. In addition, where the apparatus is of a pushbutton type, when a number of push buttons are arranged in an array there is a possibility of inadvertent double depression of the push buttons which can damage or deform the mechanism.

DISCLOSURE OF THE INVENTION

It is therefore an object of the present invention to provide an operating lever mechanism for a magnetic tape recording/reproducing apparatus which is free from the defects and disadvantages of the known arts.

It is another object of the present invention to provide an operating lever mechanism of the type wherein the different operations are carried out generally by different operation levers and the operation forces and work strokes allotted to the respective levers are made fairly uniform.

It is a still another object of the present invention to provide an operating mechanism of the type, which is capable of perfectly preventing inadvertent double depression of push buttons and achieving direct change from one operation mode to another without interposing a stop-operation therebetween.

In accordance with the present invention, there is provided an operation lever mechanism for a magnetic tape recording/reproducing apparatus which comprises: a plurality of operation levers provided in said magnetic tape recording/reproducing apparatus and imparted with different functions, respectively; engaging portions provided on said operation levers, respectively; an operating member provided between the operation levers and adapted to be operated upon depression of any one of the operation levers, through engagement thereof with the depressed operation lever to lock said lever in the depressed position and restore the operation lever adjacent said depressed lever, which has been kept depressed previously.

BRIEF DESCRIPTION OF DRAWINGS

FIG. 7 is a plan view showing a structural and operational relation between an engaging member, a swaying member and an L-shaped lever on the baseplate for the operation mechanisms;

FIG. 8 is a similar plan view showing a structural and operational relation between the swaying member and a lock member;

BEST MODE FOR CARRYING OUT THE INVENTION

Figure 3:
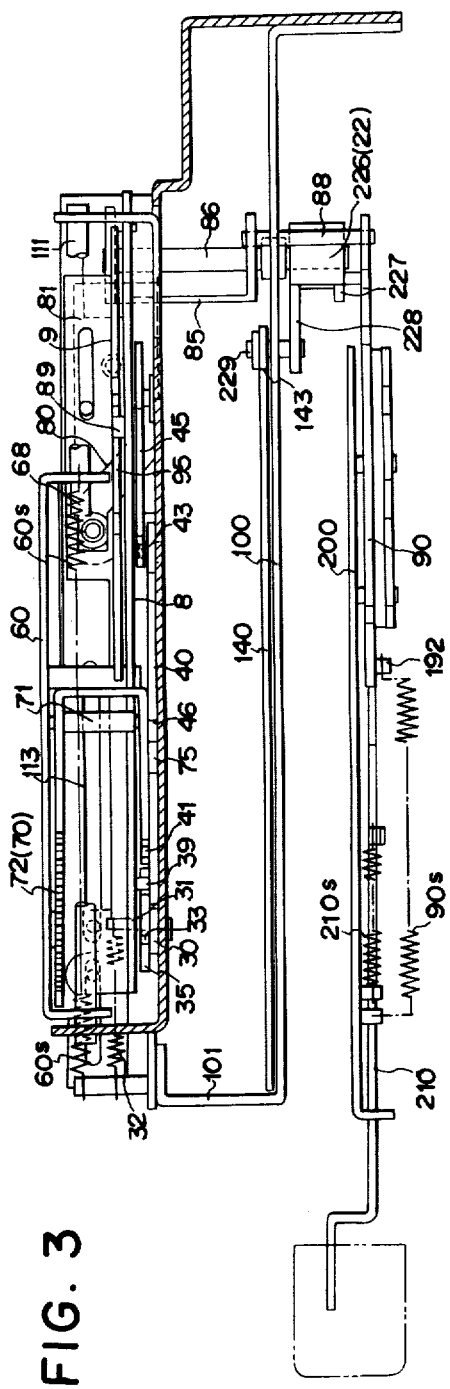
FIG. 3 is a side view of the apparatus illustrated in FIG. 1, showing a structural relation between a baseplate for operating mechanisms, a head plate and another baseplate.

Referring now to the drawings, there is illustrated a preferred form of a magnetic tape recording/reproducing apparatus in accordance with the present invention. A main chassis 100 has at a forward sideward portion thereof an upright portion 101. An operating mechanism baseplate 110 is fixed to the upright portion 101. A drive motor 120 and an electromagnetic plunger 130 is mounted on the main chassis 100 at an interior portion thereof. Another baseplate 200 is disposed under the main chassis 100 and attached thereto as illustrated in FIG. 3. On the baseplate 200 there are provided an eject-operation lever 210, (also referred to as a stop eject operation lever or member), a play-operation lever 220, a fast forward-operation lever 230, a rewind-operation lever 240 and a record-operation lever 250. These operation levers are of a pushbutton type and adapted to be depressed for carrying out the respective operations. A sidewall 102 is fixed to the main chassis 100 at a side portion thereof. The sidewall 102 and the baseplate 110 define a cassette loading or receiving area therebetween. A base end of a swingable member 50 is pivotally mounted by pins 51, 51 between the sidewall 102 and an upright portion 112 of the baseplate 110. A forward end of the swingable member 50 is connected to a cassette receiving frame 55 by a fitting plate 54, allowing a pivotal movement of the frame 55 relative to the swingable member 50. More specifically, the pivotal connection of the cassette loading frame 55 to the swingable member 50 is attained by a cooperation of a slot formed on the swingable attained by a cooperation of a slot formed on the swingable member 50 and a projection formed on the frame 55 which are loosely engaged with each other. The connection is further attained by a cooperation of a convexed portion 58 formed on the cassette loading frame 55 as high as at least the thickness of the swingable member 50 and the fitting plate 54 fixed to the convexed portion 58 by screws 57, 57 so that an edge 54a of the convexed portion may a bit overhang a forward end 50a of the swingable member 50, leaving some space therebetween in a direction of the thickness thereof. Thus, the frame 55 is allowed to pivot relative to the swingable member 50 within a limit defined by said space therebetween but kept connected to the swingable member 50 by the slot 52 and the overlapped relation between the forward end 50a of the swingable member 50 and the edge 54a of the fitting plate 54.

An opening 53 is formed in the swingable member 50 at a central portion thereof. A slide plate 60 slidably provided on the base plate 110 extends to the opening 53 and has a tip end portion 61 bent downwardly and received in the opening 53. The bent tip end portion 61 of the slide plate 60 is brought into contact with a tip end of a cassette 150 when the cassette 150 is loaded in the cassette loading area so that the slide plate 60 slides according to the retreat of the cassette 150. The cassette 150 has, as known cassettes, a recording/reproducing face 151 on a longer side thereof, holes 152, 152 for receiving reel driving members therein respectively and a tape provided between reels disposed around the holes 152, 152, respectively and guided into the recording/reproducing face 151. A stepped portion 153 is also formed on the cassette 150 at a peripheral portion thereof. A head 145 and pinch rollers 141, 141 are mounted on a head plate 140, which is mounted on the main chassis 100 and adapted to be actuated by the play-operation lever 220. The fitting plate 54 has a sideward bent portion 58 extending downwardly and provided with a guide 59. The guide 59 is engaged with a guide slot 102a and the sidewall 102 so as to guide the cassette loading frame 55 into a recording/reproducing position.

A lock plunger 160 is provided under the electromagnetic plunger 130. The plunger 160 is connected to a power switch, an interlocking member, etc. as will be mentioned in detail later, and adapted to be energized when any one of the play-operation lever 220, the fast forward-operation lever 230 and the rewind-operation lever 240 is pushed inwardly to lock said lever.

Figure 4:
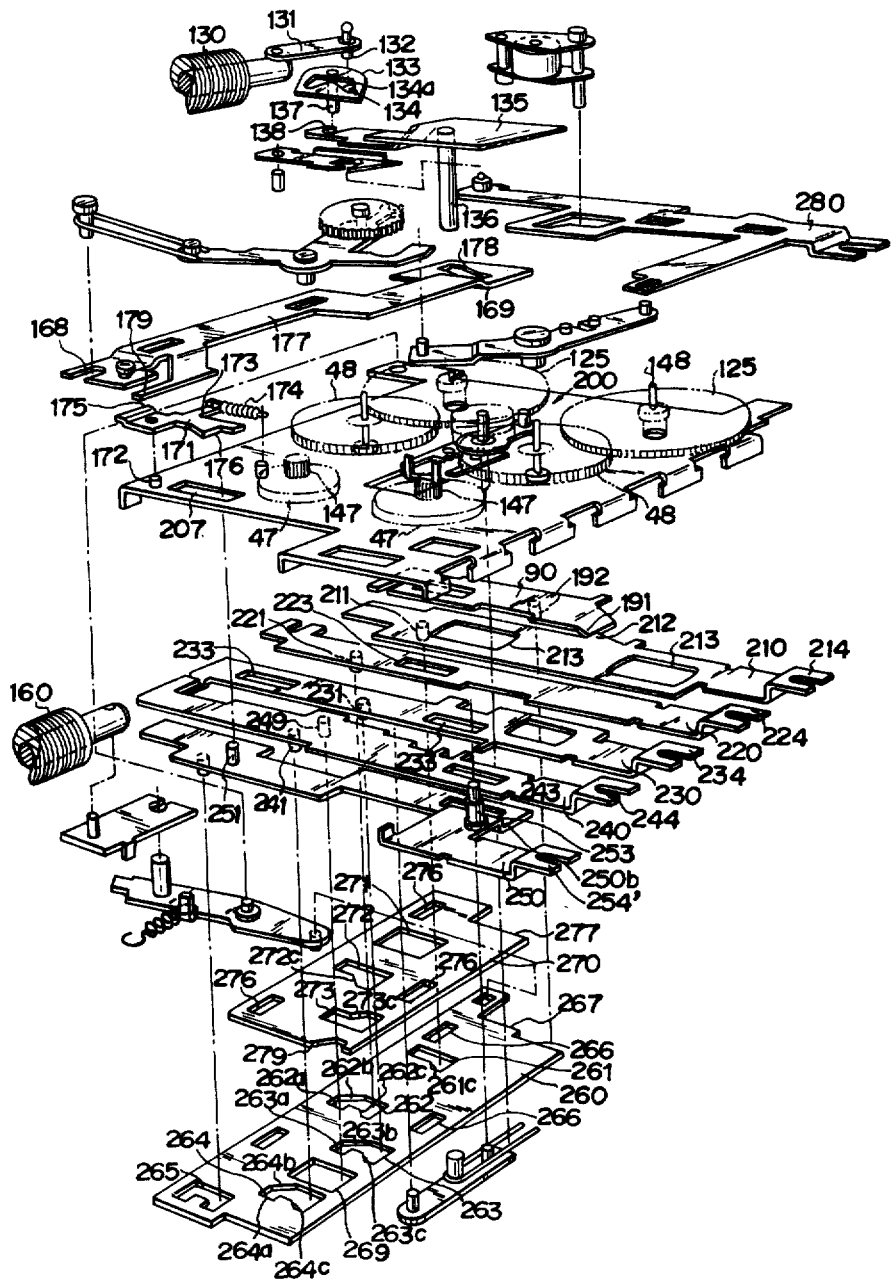
FIG. 4 is an exploded perspective view of components of the apparatus mounted on the baseplate.
Figure 5:
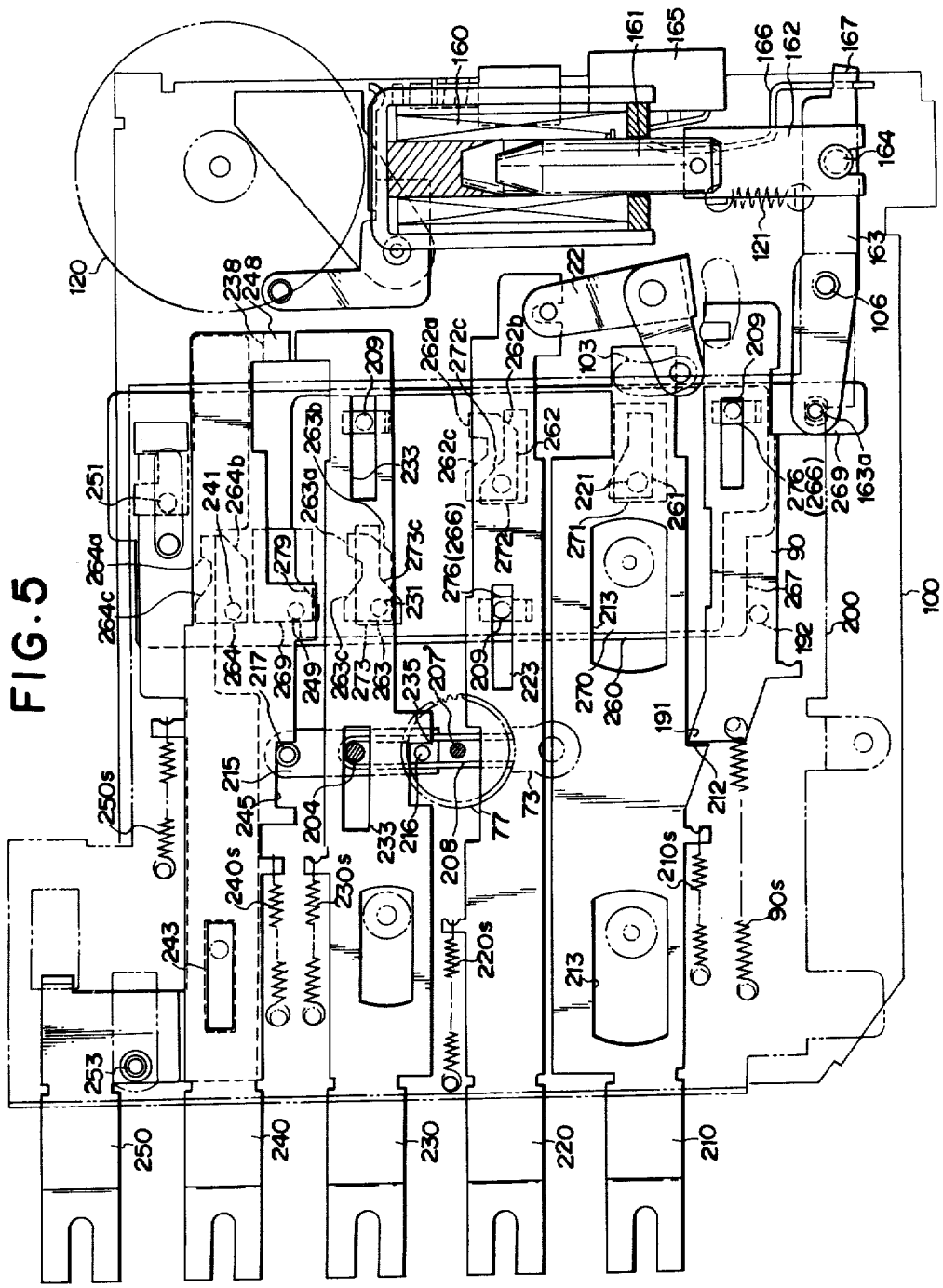
FIG. 5 is a plan view of the component illustrated in FIG. 4 which are mounted on the baseplate.
Figure 6:
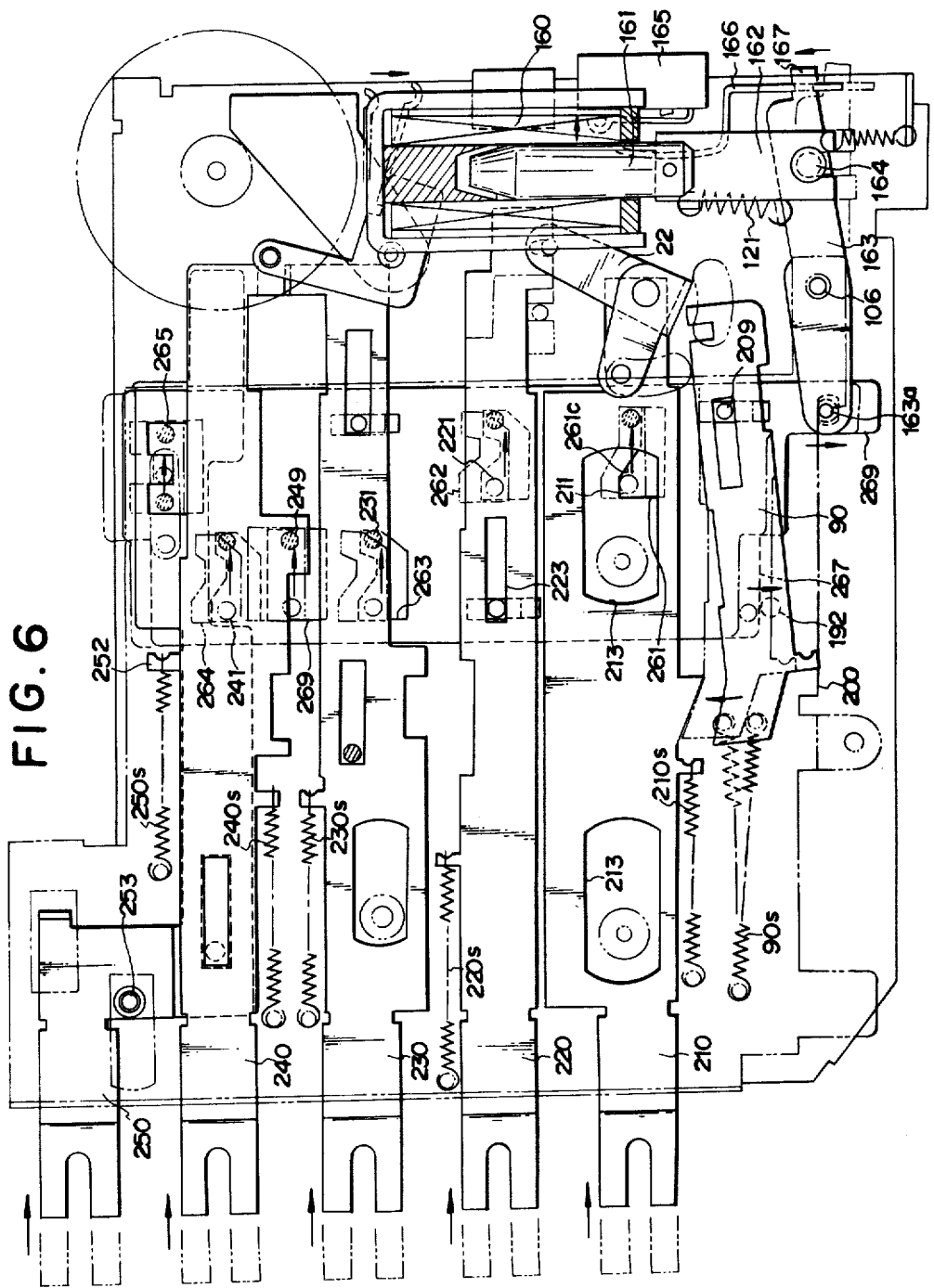
FIG. 6 is a similar view showing an operational relation between the components.

Various components of the tape recording/reproducing apparatus which are associated with the baseplate 200 are illustrated in FIG. 4 in an exploded state and in FIG. 5 in an assembled state. The operational relationships between the components are illustrated in FIG. 6. Illustratively stated, three guide pins 209, 209, 209 are provided on the bottom face of the baseplate 200 at an inner portion and intermediate portion thereof, respectively. The guide pins 209, 209, 209 are engaged with elongated slots 276 of an auxiliary lock plate 270 and elongated slots 266 of the lock plate 260, respectively. Between the auxiliary lock plate 270 and the baseplate 200 are disposed the levers 210, 220, 230, 240 and 250 juxtaposedly each other. The ejecting interlocking member 90 provided at a position outer than the first operation lever 210 is also disposed between the base plate 100 and the auxiliary lock plate 270 as can be seen from FIG. 5. The auxiliary lock plate 270 is wide enough to generally cover the first to third operation levers 210 to 230. The fifth operation lever 250 is bent at 250b in the direction of the thickness thereof so that the fourth operation lever 240 is superposed on the fifth lever at a forward and intermediate portion thereof. Thus, there is a left no substantial space in the thickness direction between the lower face of the baseplate 200 and the upper face of the lock plate 270. The operation levers have engaging pins 211, 221, 231, 241 and 251, respectively. These engaging pins 211, 221, 231, 241 and 251 are fitted in cam slots 261 to 266 formed on the lock plate 260, and an opening 271 and cam slots 272 and 273 formed on the auxiliary lock plate 270, respeciveely, so as to allow the operation levers to slide in the longitudinal direction thereof, respectively. The fourth lever 240 has another engaging pin 249 which is adapted to abut on a cam portion 279 formed on a periphery of the auxiliary lock plate 270 and received in an opening 269 formed on the lock plate 260. Springs 210s, 220s, 230s, 240s and 250s are provided on the operation levers 210 to 250, respectively, to urge the levers in directions to reset them, respectively. The interlocking member 90 is also provided with the resetting spring 90s which is mounted between the interlocking member 90 and the baseplate 200. The first operation lever 210 has the salient portion 212 formed on the periphery thereof, which is adapted to engage with the engaging portion 191 formed on a side of the interlocking member 90. The interlocking member 90 further has a pin 192 adjacently to the engaging portion 191, which is adapted to abut against an engaging portion 267 formed on the lock plate 260 and a simple cutout 277 formed on the auxiliary lock plate 270.

The cam slot 261 of the lock plate 260 has the cam portion 261c which cooperates with the engaging pin 211 to disengage the lock plate 260 from the pin 192 by releasing the engaging portion 267 thereof from the pressure applied by the pin 192 when the first operation lever 210 is pushed inwardly. The cam slots 262, 263 and 264 also have cam portions 262c, 263c and 264c, respectively, which cooperates with the pins 221, 231 and 241, respectively, to disengage the lock plate 260 from the pin 192 by releasing the engaging portion 267 from the pressure by the pin 192. In addition, the cam slots 262, 263 and 264 have cam portions 262b, 263b and 264b, respectively, to force the lock plate 260 for pressing the engaging portion 267 against the pin 192. As illustrated in FIG. 4, the cam slots 262 to 264 further have recessed portions 262a, 263a and 264a, respectively, for locking the pins 221, 231 and 241, respectively, when they are pushed inwardly. On the other hand, the cam slot 272 of the auxiliary lock plate 270 for receiving the pin 221 has a cam portion 272c in the same direction as the cam portion 262c of the lock plate 260, and the cam slot 273 for receiving the pin 231 therein has a cam portion 273c in the opposite direction to cam portion 272c. Accordingly, when the second operation lever 220 is pushed inwardly, the pin 221 makes the auxiliary lock plate 270 slide in the same direction as of the cam portions 261c to 264c of the lock plate 260. On the other hand, when the third operation lever 230 is pushed inwardly, the pin 231 makes the auxiliary lock plate 270 slide in the opposite direction, to wit, in a direction that the lock plate 260 is caused to slide by the cam portions 262b to 264b of the lock plate 270. The operation levers 210, 220, 230, 240 and 250 have elongated slots 213, 223, 233, 243 and 253, respectively, for guiding the sliding direction of the respective levers. The levers further have at their respective forward ends, securing portions 214, 224, 234, 244 and 254, respectively, for securing operating members such as push buttons thereon.

The lock plate 260 has, at a corner portion thereof, a connecting portion 269 having an elongated slot where a tip end of an actuating lever 163 is pivotally connected at 163a (FIG. 5). The actuating lever 163 is pivotally supported intermediate thereof on the main chassis 100 by a shaft 106 and connected at a base end thereof to a connecting member 164. The connecting member 164 is connected to a plunger rod 161 of the electromagnetic plunger 160 through an intermediate member 162. A power switch 165 for the plunger 160 is mounted on the main chassis 100. An operating member 166 for turning on or off the switch 165 is mounted on a securing portion 167 extending from the connecting member 164 of the actuating lever 163, and controls the switch 165 in association with the operation of the lock plate 260 to operate the plunger 160. A relatively strong spring 121 is provided between the intermediate member 162 and the actuating member 163, and a relatively weak spring is provided between the main chassis 100 and the actuating lever 163. Thus, the actuating lever 163 and the lock plate 260 are urged towards the interlocking member 90. The relatively strong spring 121 is adapted to be biased due to the cam portion 261c, 262c, 263c or 264c when each of the operating levers are depressed inwardly to operate the switch operating member 166. Thus, the spring 121 acts to smooth the operation irrespective of conditions of the plunger 160 energized.

In the aforementioned operation lever mechanism, it will be seen that when the second operation lever, namely, play-operation lever 220 is pushed inwardly, the pin 221 is caused to move within the cam slots 262 and 272 as can be seen from FIG. 5. Thus, the pin 221 acts on the cam portion 272c to move the auxiliary lock plate 270 upwardly as viewed in FIG. 5 and further acts on the cam portion 262c to displace the lock plate 260 upwardly, too. In such a course of the movement of the pin 221 within the cam slots 262 and 272, the operation lever 230 or 240, if it has been previously locked in the slot 263 or 264, is released and restored to its original position, and then the pin 221 acts on the cam portion 262b of the lock plate 260 to displace the lock plate 260 downwardly. Thus, the pin 221 is finally received in the recessed portion 262a and by a linear edge of the cam slot 272, which faces the cam portion 272c, so as to keep the pin 221 from disengaging therefrom. Similar operations are effected, when the third fast forward-operation lever 230 or the fourth rewind-operation lever 240 is pushed inwardly. The pin 231 or 241 first acts on the cam portion 263c or 264c to displace the lock plate 260 upwardly as viewed in FIG. 5 and then acts on the cam portion 263b or 264b to move the lock plate 260 downwardly, so that the pin 231 or 241 is locked in the recessed portion 263a or 264a. As to the auxiliary lock plate 270, substantially the same operations are effected irrespective of some differences in contours of the cam portions. More specifically, when the third operation lever 230 is pushed inwardly, the pin 231 acts on the cam portion 273c of the auxiliary lock plate 270 to displace the plate 270 in a direction opposite to the case of the second operation lever 220. Accordingly, where the pin 221 of the second operation lever 220 has been previously locked by a recessed portion 262a, the auxiliary lock plate 270 is displaced to release the locking by the action of the pin 231 on the cam portion 273c for restoring the second operation lever to its original position. Furthermore, the cam portion 272c of the so displaced auxiliary lock plate 270 holds the second operation lever 220 in the restored position. When the fourth operation lever 240 has been previously locked, the pin 231 acts on the cam portion 263c to release the pin 241 from the recessed portion 264a for restoring the lock plate 260 and to hold the pin by the cam portion 264c. At the same time, the auxiliary pin 249 is also held by the cam portion 279. Thus, the depression of the operation levers 220 or 240 can be prevented. On the other hand, as to the fourth operation lever 240, the pin 241 and the auxiliary pin 249 are conjointly moved inwardly and the auxiliary pin 249 acts on the auxiliary lock plate 270 in a similar manner to the case of the pin 231. That is, the pin 249 acts to release and restore the second or the third operation lever 220 or 230, where it has been preliminarily locked. At the same time, the pin 221 or 231 of the so restored operation lever 220 or 230 is held by a cam portion 262c or 263c. Further, the lever 240 is also locked in the inwardly pushed position with the pin 241 received in the recessed portion 264a and the auxiliary pin 249 engaged with a linear edge 278 interior of the cam portion 279. In other words, though the auxiliary lock plate 270 has no cam slot corresponding to the cam slot 264, the auxiliary pin 249 cooperates with the cam portion 279 to act for the pin 231 of the third operation lever 230 and the cam portion 273c. Therefore, an operation similar to the case of the third operation lever 230 is attained. As to the fifth operation lever, namely, record-operation lever 250, the pin 251 is received in the ⊐-shaped slot 265 and allows the lock plate 260 to slide under any condition. The fifth record-operation lever 240 is provided with a mechanism for preventing inadvertent operation so that it is thrown into operative condition only when the tape is in a forward feed mode and a loaded tape is in a position to allow recording. The second operation lever 220 is for a play-operation and adapted to advance or retreat the head plate 140 through the operating member 22. More particularly, when the operating member 22 is rotated within a limit of the arcuate slot 103, the head plate 140 on the main chassis 100 is advanced towards the tape pack set in the recording/reproducing position to press the head 145 and the pinch rollers 141 against the tape for achieving a play mode. On the other hand, when the head plate 140 is retired, a play stop mode is established. It can be apparently seen from FIGS. 1 and 2 that such a play mode is established when the operation lever 220 is pushed inwardly.

When the first stop or eject operation lever 210 is inwardly pushed independently of the interlocking member 90, namely, without engaging with the member 90, the play mode formed by the inward depression of the second operation lever 220 is released and a play stop mode is established. More particularly, when the operation lever 210 is pushed inwardly with the salient portion 212 thereof abutting against the engaging portion 191, the interlocking member 90 is pushed conjointly with the lever 210. However, if any one of the operation levers 220 to 240 is operated, the pin 221, 231 or 241 acts on the cam portion 262b, 263b or 264b at a final step of the retreating course to displace the lock plate 260 towards the interlocking plate 90. Upon displacement of the lock plate 260, the engaging portion 267 displaces, through the pin 192, the engaging portion 191 of the interlocking member 90 outwardly so that the salient portion 212 of the lever 210 does not come to contact the engaging portion 191. When the first operation lever 210 is pushed inwardly under such conditions, the lever 210 is moved without engaging with the interlocking member 90. At this time, the pin 211 acts on the cam portion 261c to slide the lock plate 260 in the opposite direction to the case of the cam portions 262b etc., releasing the pins 221 etc. from the recessed portions 262a. Thus, the play stop mode is established. Where the interlocking member 90 is pushed conjointly, the hook portion 99 formed at the rear end of the interlocking member 90 operates to effect cassette ejection. As can be understood, in this case, none of the second to fourth operation levers is depressed. If any one of the second to fourth operation levers is depressed, the salient portion 212 does not engage with the engaging portion 191 as mentioned above. Accordingly, where the interlocking member 90 is allowed to move conjointly with the first operation member 210, the play stop mode is not formed but the cassette ejection is carried out. The mechanism for carrying out the cassette ejection comprises means pulling up the tape pack from the lowered set position on the main chassis 100 to an appropriate height and then projecting the tape pack out of the loading opening. Various mechanisms have been proposed and put into a practical use for carrying out the cassette ejection, and any known mechanism may be employed in the magnetic tape recording/reproducing apparatus of the present invention.

A specific arrangement for realizing desired dividing of operation forces necessary for the cassette loading operation or the cassette ejection operation will now be described.

The slide plate 60 is adapted to slide through engagement with a guide rod 111 provided on the baseplate 110 along the length thereof and another engagement with a guide slot 113 formed on the upright portion 112. The slide plate 60 has an arm portion 62 which extends over the upright portion 112 to the cassette loading area. The arm portion 62 is bent downwardly, at the rearward tip end thereof, to form the engaging end 61. The slide plate 60 further has a step 63 and an opening 64 formed at the central portion thereof along the step 63. A rack portion 65 extends from the arm portion 62 on the same plane as the arm portion 62 is into the opening 64. On the other hand, a swaying member 70 is rotatably mounted on the baseplate 110 by a shaft 71 and provided with an arcuate gear portion 72 in mesh with the rack portion 65. As can be seen from FIGS. 2, 7 and 8, the swaying member 70 is formed into a ⊐-shape, and has an upper planar portion with the gear portion 72 formed at the periphery thereof and a lower planar portion with an operating portion 74 formed at a tip end thereof.

A slide frame 8 is mounted on the baseplate 110 and has sidewalls 81, 82 formed integrally with the slide frame 8. An engaging member 81a is provided on the sidewall 81 and engages with a guide slot 114 formed on the upright portion 112 at a forward end thereof. On the other hand, a guide slot 82a is formed on the sidewall 82 and engaged with a pin 115 provided on the baseplate 110. Thus, the slide frame 8 is adapted to slide within a limit defined by the guide slots 114 and 82a. The slide frame 8 further has a hook portion 83 (FIG. 9) formed at a rearward end thereof. The hook portion 83 is engaged with an engaging pin 87 provided on an upper portion of a ⊐-shaped operating member 83' pivotally supported by a shaft 86 at the interior of the main chassis 100.

Another engaging pin 88 is provided on a lower portion of the operating member 85 (FIG. 3). The engaging pin 88 extends downwardly to project through an arcuate slot 108 formed in the main chassis 100, and engages with a hook portion 91' of an interlocking member 90 disposed in a plane parallel to a plane in which the eject-operation lever 210 is disposed, as illustrated in FIG. 3. The slide frame 8 further has an opening 84 formed at a forward portion thereof (FIG. 8). The opening 84 receives therein a pin 31 which is provided at an end of a turning member 30 pivotally supported intermediate thereof on the baseplate 110. A spring 32 is provided between an upper end portion of the pin 31 projected from the slide frame 8 and the baseplate 110. Another pin 33 provided on the turning member 30 at the opposite end thereof is engaged with an elongated slot 34 formed at a free end portion of an engaging member 35 (FIG. 7) which is also pivotally supported on the baseplate 110. The engaging member 35 has, at the free end portion thereof, a hook portion 36 and a slanting guide edge 37 adjacent the hook portion 36. On the other hand, a floating member 40 is further provided on the base plate 110 and has a projection 39 at an end thereof. The projection 39 is adapted to abut against the hook portion 36 or the slanting edge 37. The floating member 40 further has a projection 38 at the opposite end thereof and a projection 41 adjacently to the projection 39. The projection 41 is disposed within an area of a pivotal movement of the operating portion 74 of the swaying member 70. In this connection, it is to be noted that the projection 38 of the floating member 40 is so formed that it projects from an upper and a lower face of the floating member 40. The downwardly projected portion of the projection 38 is engaged with an arcuate slot 119 formed on the base plate 110 and regulates the rotating movement of the floating member 40 around the projection 39 as depicted by a solid line and a phantom line in FIG. 7. On the other hand, the upper portion of the projection 38 is adapted to abut against an engaging portion 43 formed at an end of another engaging member, i.e., an L-shaped lever 45 mounted on the baseplate 110 by a shaft 44. Another end of the L-shaped lever 45 projects a bit out of the baseplate 110 to form a hook portion 42. A spring 118 is provided between the hook portion 42 and a spring rest 117 formed at the interior of the baseplate 110. The floating member 40 has a protruded cam portion 46 intermediate thereof. An operating portion 75 provided on the lower face of the swaying member 70 so as to project downwardly therefrom is adapted to abut against the cam portion 46 of the floating member 40, so that the floating member 40 is displaced upon movement of the swaying member 70. The working range and stroke of the floating member 40 is adjustable by varying the position and/or the configuration of the cam portion 46.

Figure 2:
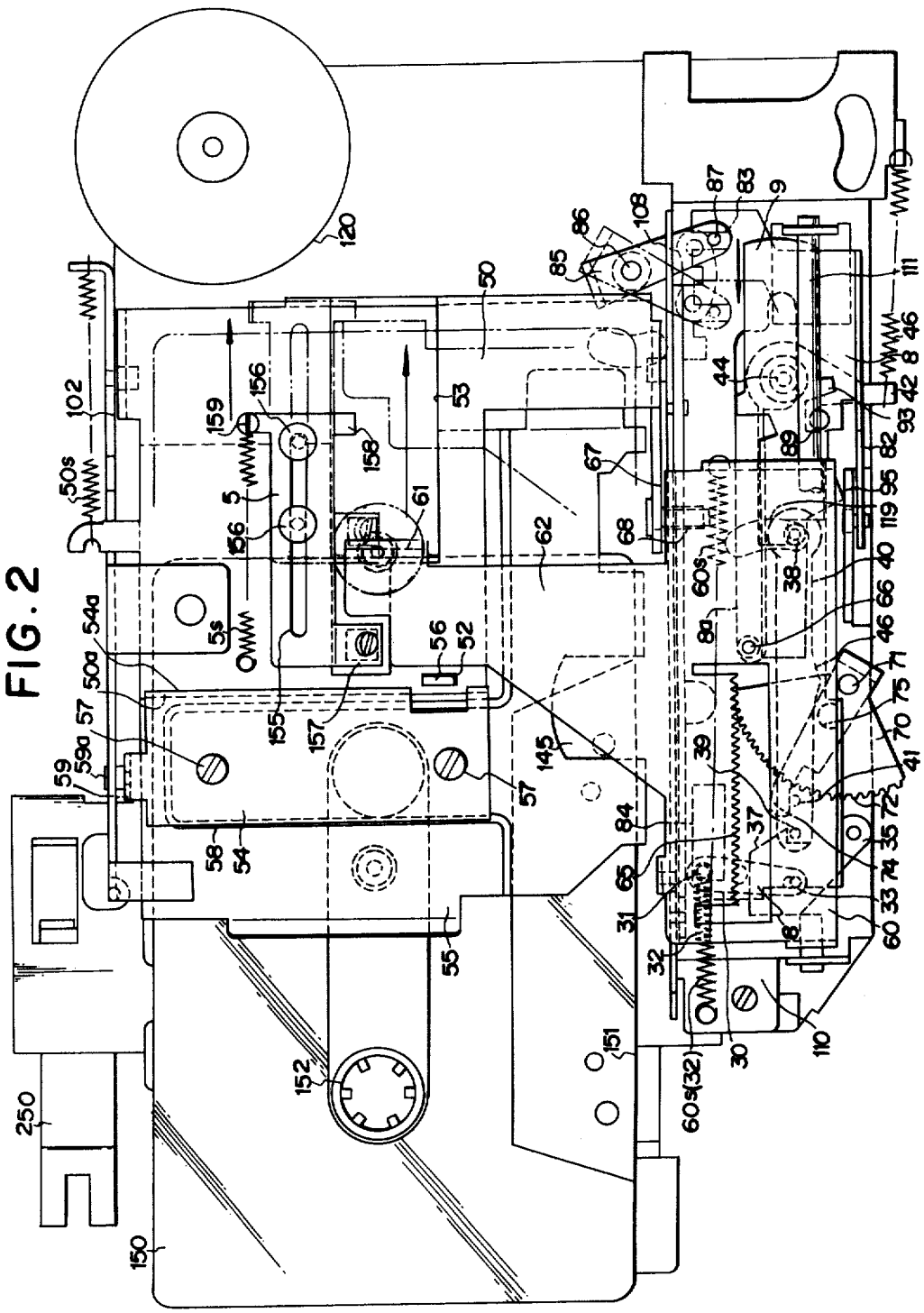
FIG. 2 is a plan view of the apparatus illustrated in FIG. 1.

Above the L-shaped lever 45, another lock member 9 is supported by the shaft 44. The lock member 9 has, on one side thereof, a projected portion 91 engageable with a pin 66 provided on the lower face of the slide plate 60 and projected through a guide slot 8a formed on the slide frame 8 and a recessed portion 92 adjacent to the projection portion 91. The lock member 9 further has, at another side thereof, a projected portion 93 engageable with a projection 89 provided on the slide frame 8, a recessed portion 94 adjacent to the projected protion 93 and a slanting guide portion 95 adjacent to the recessed portion 94. The lock plate 9 is thus adapted to lock the slide plate 60 and the slide frame 8. When the cassette 150 is not loaded, the projection 89 of the slide frame 8 is engaged with the recessed portion 94 to prevent a forward movement of the slide frame 8 as illustrated in FIG. 2. If the cassette 150 is put into the apparatus and pushed inwardly, the slide plate 160 is caused to move rearwardly and accordingly the pin 66 therein also moves rearwardly along the guide slot 8a. Eventually, the pin 66 hits and pushes the projected portion 91 to rotate the lock member 9 clock-wise as viewed in FIG. 2, keeping an arcuate rear end 96 of the lock member 9 engaged with a mounting seat of the guide rod 111, to wit, around the engaging portion. The lock of the slide frame 8 is then released. The released slide frame 8 is pulled forwardly by the action of the spring 90s (FIG. 3) provided on the interlocking member 90, and the projection 89 on slide frame 8 pushes the inclined guide portion 95 as illustrated in FIG. 8 to further rotate the lock member 9 clockwise and to locate the pin 66 in the recessed portion 92 for locking the slide plate 60 in a retracted position. When the operation lever 210 is pushed inwardly for effecting a cassette ejection operation and the slide frame 8 is caused to move rearwardly through the operating member 85, the projection 89 pushes the projected portion 93 to rotate the counterclockwise and disengage the pin 66 from the recessed portion 92. Then, the slide plate 60 returns to its original position by the action of the spring 60s. The pin 66 moves along a linear edge 97 of the lock member 9 and the lock member 9 is restored to a state as illustrated in FIG. 2 where the projection 89 is received in the recessed portion 94 to lock the slide frame 8. In accordance with the aforesaid arrangement, the operability is improved by a click operation of the L-shaped member 45 and the floating lever 40 during the ejecting operation, and the operation forces required for the respective levers are made even and desired respective operations can be attained by the substantially equal strokes of the operations.

Figure 1:
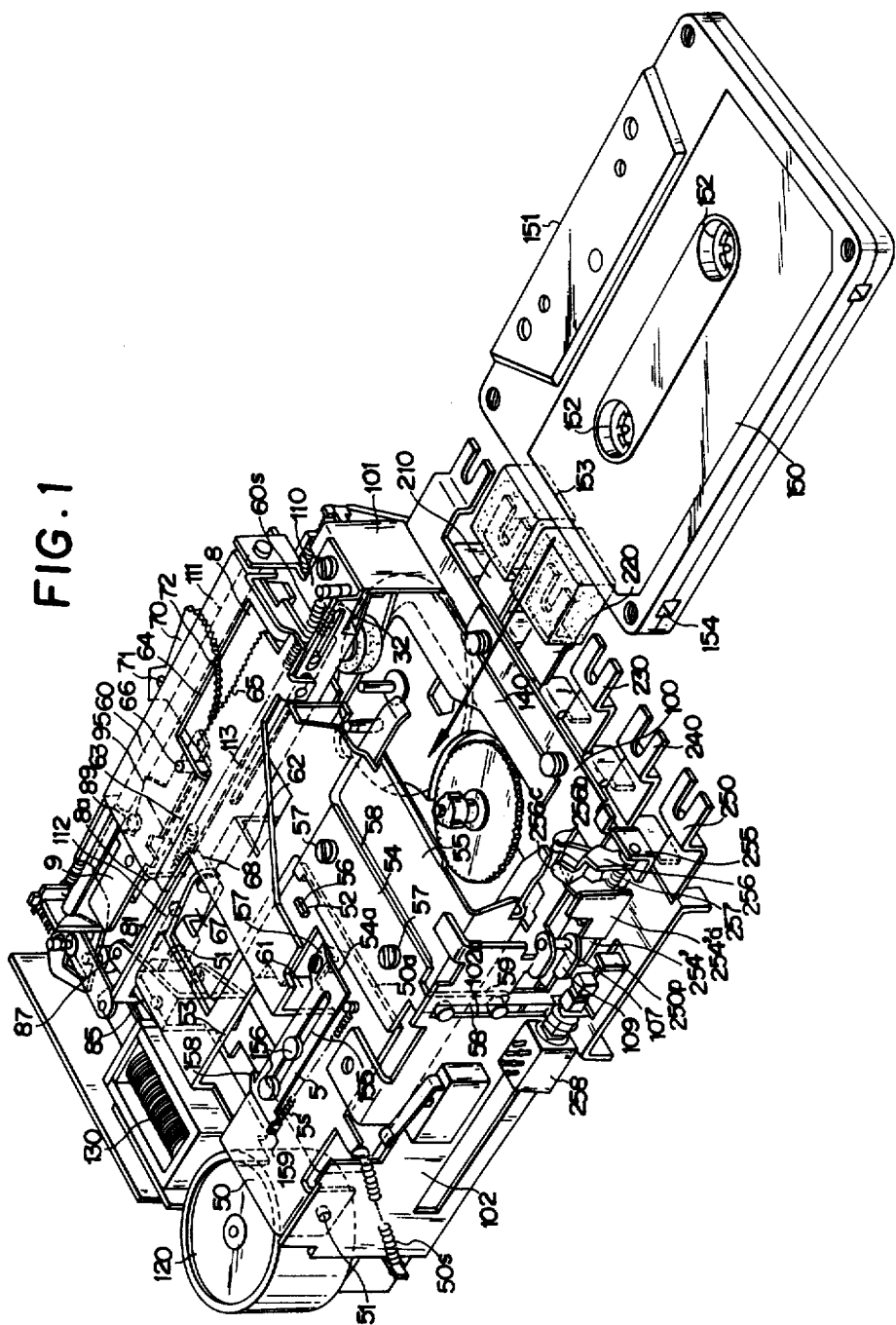
FIG. 1 is a perspective view of a magnetic tape recording/reproducing apparatus in accordance with the present invention.
Figure 9:
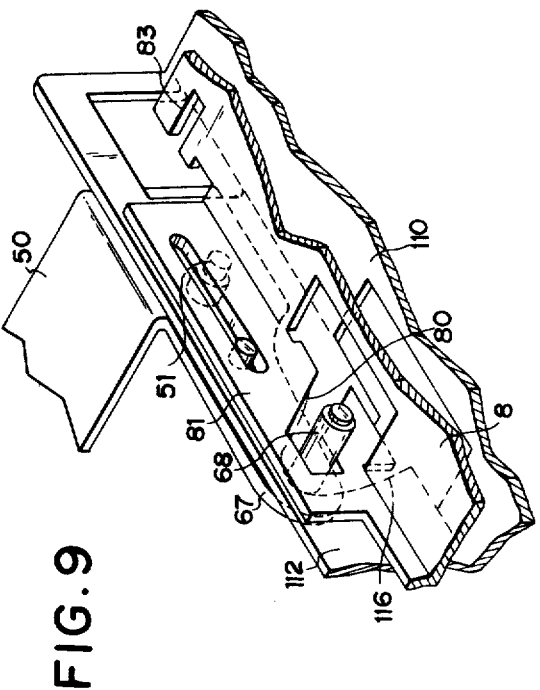
FIG. 9 is a fragmentary perspective view of a mechanism for lowering a tape pack.

The slide frame 8 has a cam slot 80 formed on the side wall 81 as depicted in FIG. 9. On the other hand, the upright portion 112 of the baseplate 110 has a cutout 116. In the cam slot 80 and the cutout 116 is fitted a roller 68 provided on an arm portion 67 extended from the swingable member 50 along the upright portion 112. When the cassette is fully pushed inwardly and the slide frame 8 is pulled forwardly, the cam slot 80 acts to lower the arm portion 67 through the roller 68 so that the swingable member 50 is inclined downwardly to put the cassette loading frame 55 onto the main chassis 100. On the other hand, when the cassette 150 is ejected, the slide frame 8 moves oppositely to the aforesaid case so that the swingable frame 50 resumes its horizontal position and the cassette loading frame 55 is raised from the main chassis 100. In this connection, it is to be noted that a spring 50s is provided between a forward portion of the swingable member 50 and the sidewall 102 as illustrated in FIG. 1. Therefore, the lowering of the cassette loading frame 55 onto the main chassis 100 is carried out smoothly keeping an appropriate balance.

The head plate 140 mounted on the main chassis 100 is adapted to be actuated by the play-operation lever 220. To this end, an operation member 22 is provided on the shaft 86 which extends downwardly from the main chassis 100 as depicted in FIG. 3. More specifically, the operation member 22 is formed in a ⊐-shape and has a pivotal support portion 226, a first projection 227 formed on a lower portion of the member 22 and a second projection 228 formed on an upper portion of the member 22 and extending in a direction perpendicular to the first projection 227. The projections 227 and 228 have pins 229. The projection 227 is engaged with a hook portion 220a of the play-operation lever 220. The projection 228 is engaged, through the arcuate slot 103 of the main chassis 100, with an elongated slot 143 of the head plate 140 which is slidably mounted on the main chassis 100.

In accordance with the arrangement as mentioned above, a plurality of operation levers are provided to effect the respective operations so that the operation forces required to the respective levers are reduced. Further according to the invention, upon actuation of any one of the levers, a desirable locking is achieved to prevent inadvertent misoperation such as double depressing of the push buttons. Further, direct change from one operation mode to another can be effected without throwing the mechanism once into stop mode. In addition, since a single operation lever is used in common for a stop operation and an eject operation, the apparatus can show, when assembled with an ordinary car pushbutton tuner, a fine unity therewith even if a record-operation lever is additionally provided.

Figure 10:
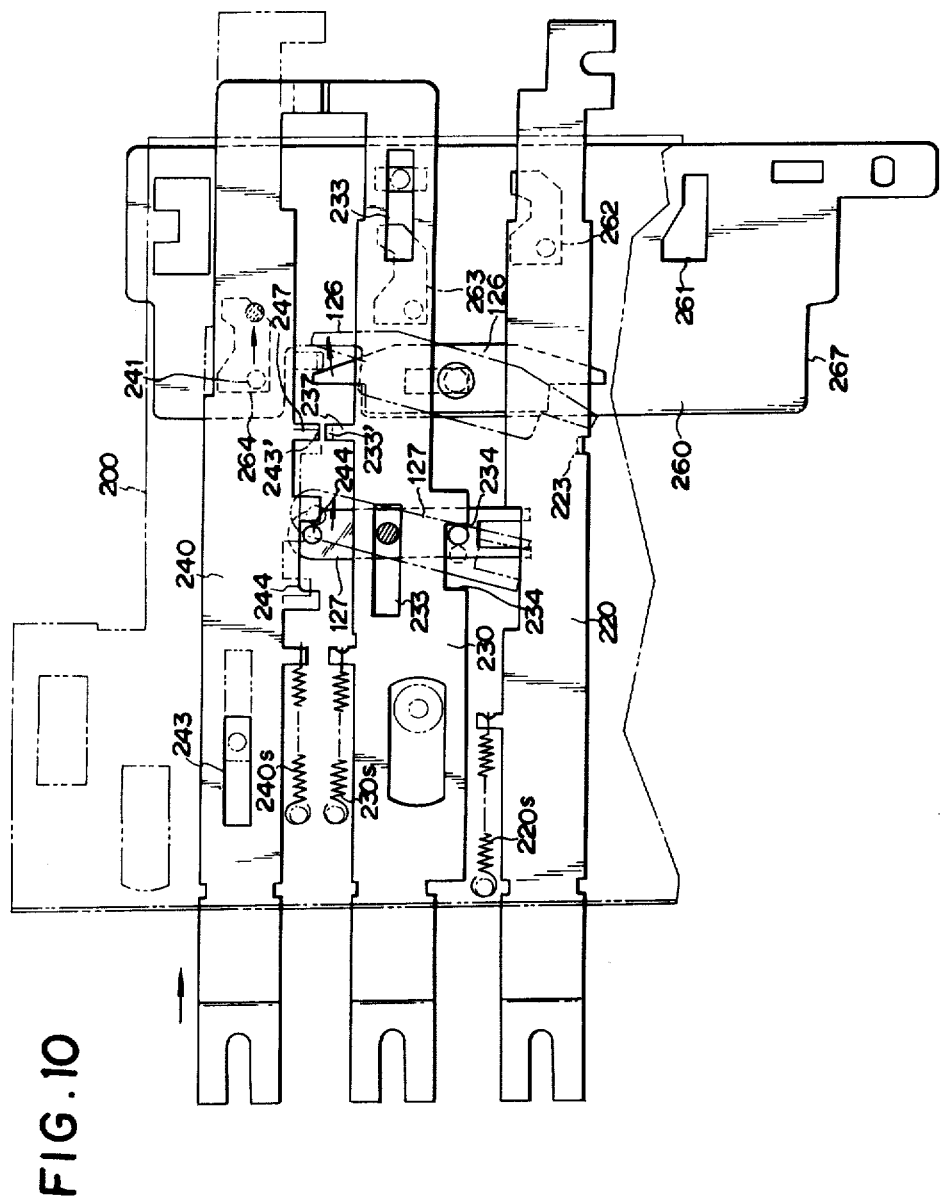
FIG. 10 is a modified form of an operation lever mechanism employable in the present invention.
Figure 11:
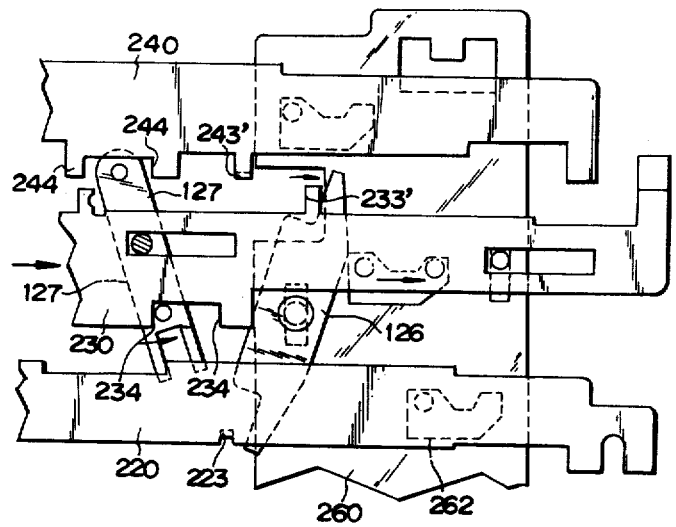
FIGS. 11 and 12 are explanatory views showing the operation of the mechanism illustrated in FIG. 10.
Figure 12:
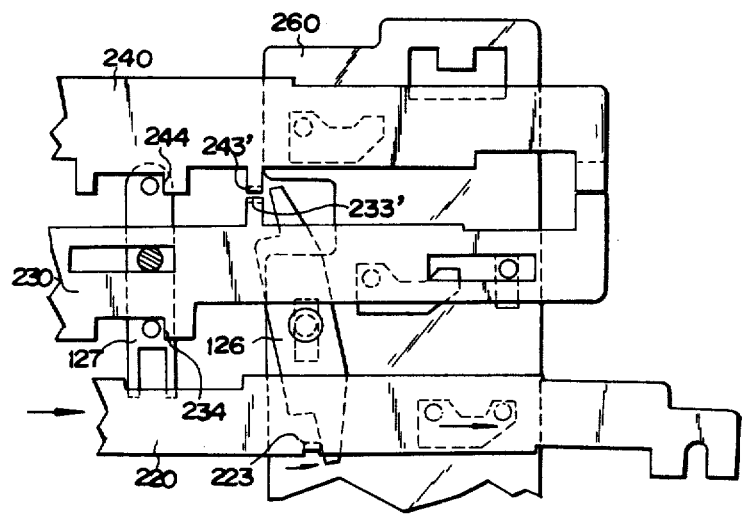

Though the direct switching mechanism and double depression preventing mechanism as mentioned above are comprised of cam portions 262b, 263b, 264b etc formed on the cam slots 261 to 265 of the lock plate 260, respectively, and the cam portions 272c, 273c, 279 etc. of the auxiliary lock plate 270, such mechanisms may be formed without employing cam portions of the lock plate and the auxiliary lock plate. More specifically, FIGS. 10 to 12 show the mechanisms provided between the second to the fourth operation lever 220 to 240. The second operation lever 220 is formed with an engaging portion 223' and the third and fourth operation lever 230 and 240 are formed with engaging portions 233' and 234 and engaging portions 243' and 244, respectively. The engaging portions 233' and 243' provided at positions corresponding to the engaging portions 223' are formed on projections 237 and 247, respectively, which symmetrically project from the levers 230 and 240, respectively, so as to be adjacent each other. A seesaw lever 126 is provided between the engaging portions 223', 233' and 243' and pivotally supported intermediate thereof. A similar seesaw lever 127 is provided between the engaging portions 234 and 244 and pivotally supported intermediate thereof. The pivotal points of the levers 126 and 127 are set back by a half retreating stroke from the respective engaging portions in the restored position thereof.

The operational relation between the components of the mechanisms is illustrated in FIGS. 11 and 12. When any one of the operation levers is depressed, either one of or both of the seesaw levers 126 and 127 are tilted to allow the depression of said operation lever by a given stroke. The tilting of the seesaw lever or levers will restore the operation lever which has been previously depressed, attaining the direct switching function. When the operation lever 220 and either one of or both of the operating levers 230 and 240 are depressed at a time, they are prevented from retreating more than half stroke by the lever 126. When the operation levers 230 and 240 are actuated at the same time, the seesaw lever 127 prevents them from retreat more than half stroke. In either case, double depression can be effectively prevented.

While the figures illustrate the mechanism provided between the three operation levers, similar function may be obtained by employing a plurality of seesaw levers as mentioned above and combining them appropriately where such mechanism are required to be provided between four or more operation levers. For example, when the mechanism is required to be applied to the fifth operation lever 250, the seesaw lever 126 is used for the lever 250. When the first operation lever 210 also requires the mechanism, such an arrangement as of the seesaw lever 127 is employed between the second operation lever 220 and the first operation lever 210, and two seesaw levers 126 are provided between the first and the second operation lever 210 and 220 and between the third and fourth operation lever 230 and 240. Thus, the arrangement as specified above can be effectively employed irrespective of the number of the operation levers.

In accordance with the arrangement as mentioned above, a desired operation lever can be directly actuated without using a stop lever even if another operation lever is already depressed. Furthermore, so-called double depression where two or more operation levers are depressed at a time can be effectively prevented, so that a mechanical trouble such as a mechanical damage or deformation can be avoided.

We claim:

1. Operating mechanism for a magnetic tape recording/reproducing apparatus which comprises: a plurality of depressible operation members provided in said magnetic tape recording/reproducing apparatus; support means on which a magnetic head is mounted, said operation members including at least a play-operation member for advancing said support means, a stop-operation member for withdrawing said support means, a fast forward-operation member and a rewind-operation member; locking means for releasably locking at least the depressed member other than said stop-operation member in its operative depressed state; an interlocking member is provided in association with said stop-operation member for carrying out a cassette ejecting operation when fully moved with the same, said interlocking member having a salient portion and said stop operation member having an engaging portion; stop operation means responsive to the movement of said stop-operation member while one of the other operation members is depressed by preventing the movement of said interlocking member with said stop-operating member to stop an ejection operation; and ejecting operation means responsive to the movement of said stop-operation member while no other operation member is depressed for allowing movement of said interlocking member therewith to effect said cassette ejecting operation; said salient portion of said interlocking member being adapted to be brought into engagement with said engaging portion of said stop operation member by said ejecting operation means, and said salient portion being adapted to be kept from engagement with said engaging portion by said locking means.

2. Operating mechanism for a magnetic tape recording/reproducing apparatus according to claim 1, which further comprises engaging portions formed on the operation members and at least one seesaw lever pivotally supported intermediate the ends thereof, said engaging portions of said operating members being engageable with the seesaw lever, respectively, said seesaw lever being adapted to be operated by an engaging portion of an operation member when it is depressed, to allow retreat of said operation member.

3. The operating mechanism of claim 1 wherein said salient portion of said interlocking member is adapted to be brought into engagement with said engaging portion of said stop operation member by said ejecting operation means when none of said operating members other than said stop operating member is depressed.

* * * * *